(No Model.)
F. MILLER.
CAR COUPLING.
No. 342,028. Patented May 18, 1886.
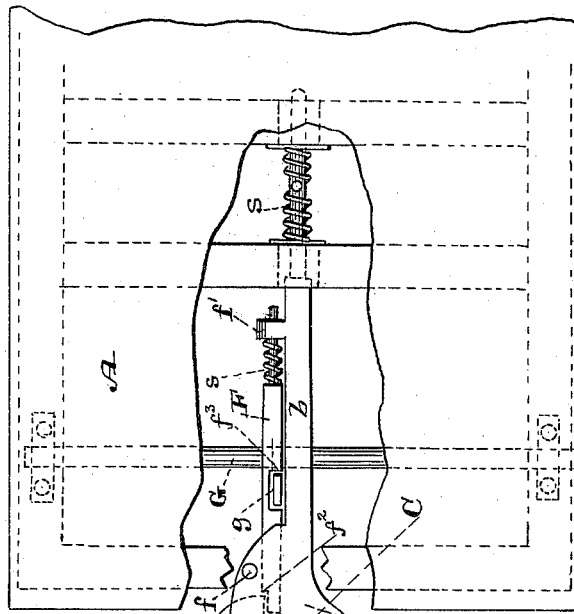
FIG. 1.
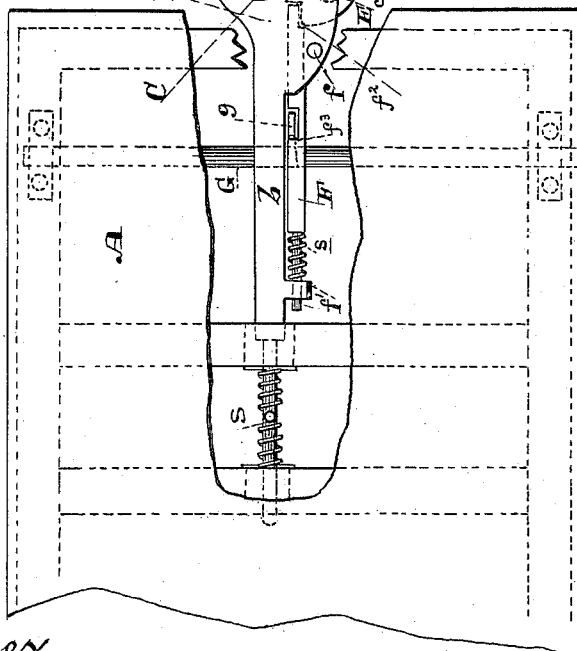
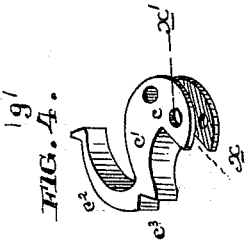
FIG. 4.
FIG. 3.
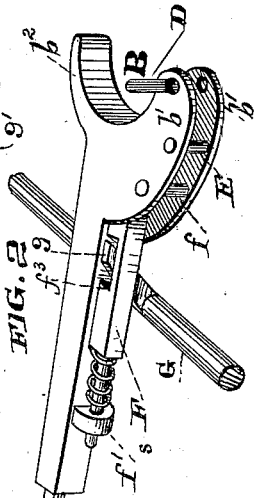
FIG. 2.
Witnesses,
Geo. H. Strong.
J. H. Rouse.
Inventor
Frank Miller
By
Dewey & Co.
Attys.

UNITED STATES PATENT OFFICE.

FRANK MILLER, OF OLEMA, ASSIGNOR OF ONE-FOURTH TO UPTON M. GORDON, OF SAN RAFAEL, CALIFORNIA.

CAR-COUPLING.

SPECIFICATION forming part of Letters Patent No. 342,028, dated May 18, 1886.

Application filed February 24, 1886. Serial No. 193,070. (No model.)

*To all whom it may concern:*

Be it known that I, FRANK MILLER, of Olema, county of Marin, and State of California, have invented an Improvement in Car-Couplings; and I hereby declare the following to be a full, clear, and exact description thereof.

My invention relates to the class of car-couplings; and it consists in oppositely-located spring-actuated draw-heads of peculiar construction, a novel pivoted or swinging hook in each draw-head, a spring-actuated lock-bar for each hook, and means for withdrawing the lock-bar, all of which I shall hereinafter fully describe.

The object of my invention is to provide a simple and effective car-coupling whose engagement is automatic, and the release of which can be effected without having to go between the cars.

Referring to the accompanying drawings, Figure 1 is a plan of my car-coupling. Fig. 2 is a perspective view of one draw-head. Fig. 3 is a view of the hook. Fig. 4 is a view of the hook modified to receive an ordinary link and pin.

A are the cars.

B are the draw-heads, the shanks $b$ of which pass back under the cars in suitable guides, and have a longitudinal movement controlled by a spring, S, on the rear of the shanks. The draw-heads are each formed with a slotted or two-part bearing, $b'$, and an oppositely-located guard, $b^2$, these parts being arranged in one draw-head the reverse of those in the other.

C are the hooks, which may be described as consisting of a head, $c$, a body, $c'$, and a tail-piece, $c^2$, the whole resembling in outline an imperfectly-formed S. These hooks are pivoted in the slotted bearings $b'$ by pins or rivets D, which pass through the hooks about where the head joins the body, and when they move on their pivots their tail-pieces pass behind pins or blocks E, which are secured in the bearings $b'$ a little farther back. Where the tail-piece joins the body of the hooks is made a notch, $c^3$, and a lip or catch, $c^4$, is formed on the end of the tail-piece.

F are the lock-bars. These lie parallel with the shanks of the draw-heads, and are secured thereto by guide-pins $f$ in the bearings $b'$ and guide-sockets $f'$ on the shanks. Springs $s$ hold the lock-bars forward. The outer ends of these bars have a rib or flange, $f^2$.

G is a rock-shaft journaled transversely under the car, and having an arm, $g$, extending upwardly and engaging a shoulder, $f^3$, on the lock-bar. The end of the shaft has a crank, $g'$, which extends to within reach of the brakeman, whether on a flat or a box car.

The operation of my car-coupling is as follows: The hooks C are first thrown back to an open position, with their heads to one side, their bodies extending transversely of the draw-heads, and their tail-pieces limited by the engagement of their catches $c^4$ with the end or head of the lock-bars F, which, under the influence of the springs $s$, are pressed forward with sufficient force to hold the hooks in their open position against any ordinary jar, though not against the positive force of the coupling operation. The draw-heads now come together, and as they fit into each other the head of each hook comes in contact with the opposing body of the other, so that each is forced around on its pivot until the two heads are interlocked each within the other draw-head. This movement of the hook carries the notches $c^3$ back into line with the ends of the lock-bars F, which spring forward and engage them, while the ribs $f^2$ bear against the base of the tail-pieces. This locks the hooks effectually and prevents further movement. The tail-pieces have passed behind the pins or blocks E, and the drawing strain is resisted or borne not only by the pivot-pins D of the hooks, but by the pins or blocks E as well, and these blocks may be made as heavy as desirable, thus giving the coupling any desired strength.

In order to release the coupling, the crank $g'$ is operated so that the shaft G is rocked and its arm $g$ made to force back the lock-bar F, thus relieving the hook, whereby the opposite one may be drawn out.

In case it be desired to couple a car with the old form of draw-head with link and pin to a car furnished with my draw-head, I make in the head of the hook C a slot, $x$, and a hole, $x'$, for the reception of the link and pin, Fig. 4.

Having thus described my invention, what I claim as new, and desire to secure by Letters Patent, is—

1. The draw-heads B, having the two-part or slotted bearings $b'$ and oppositely-located guards $b^2$, in combination with the curved pivoted hooks C and the locking-bars F, sliding in bearings on the side of the draw-head, substantially as herein described.

2. In a car-coupling, the combination of the draw-heads B, the hooks C, pivoted therein, and having tail-pieces $c^2$, the pins or blocks E within the draw-heads, with which the tail-pieces engage, and the lock-bars F, for engaging the hooks, substantially as described.

3. In a car-coupling, the combination of the draw-heads B, having the pins or blocks E in one side, the hooks C, pivoted in the draw-heads, and having notches $c^3$ and tail-pieces $c^2$, engaging the pins or blocks E, and the spring-actuated lock-bars F, for engaging the notches $c^3$ of the hooks, substantially as described.

4. In a car-coupling, the draw-heads B, having the pins or blocks E in one side, the hooks C, pivoted in the draw-heads, and having notches $c^3$, and tail-pieces $c^2$, with catches $c^4$ on their ends, said tail-pieces engaging the pins or blocks E, in combination with the spring-actuated lock-bars F, for engaging the notches $c^3$ of the hooks, and having ribs $f^2$, bearing against said hooks, substantially as described.

5. In a car-coupling, the draw-heads B, formed with shanks $b$, actuated by springs, and slotted bearings $b'$, with opposing guards $b^2$, and the pins or blocks E in the slotted bearings, in combination with the hooks C, pivoted in the slotted bearings, and having notches $c^3$, and tail-pieces $c^2$, with catches $c^4$, and tail-pieces engaging the pins or blocks E, and the spring-actuated lock-bars F, guided upon the shanks of the draw-heads and engaging the notches of the hooks and the catch of the tail-pieces, substantially as described.

In witness whereof I have hereunto set my hand.

FRANK MILLER.

Witnesses:
W. O. L. CRANDELL,
VAL SHOCKEY.